(12) United States Patent
Jaeger et al.

(10) Patent No.: US 6,731,872 B1
(45) Date of Patent: May 4, 2004

(54) METHOD FOR MONITORING THE OPERATION OF OPTICAL FIBERS

(75) Inventors: Hubert Jaeger, Pullach (DE); Gerhard Stortz, Poing (DE); Detlef Stoll, Boca Raton, FL (US); Reinhard Johannsen, Taufkirchen (DE); Wilhelm-Martin Plotz, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/515,916

(22) Filed: Mar. 1, 2000

(30) Foreign Application Priority Data

Mar. 4, 1999 (DE) .......................... 199 09 565

(51) Int. Cl.⁷ .................. H04B 10/08; H04B 10/00; H04B 10/02
(52) U.S. Cl. ..................... 398/9; 398/167; 398/177
(58) Field of Search ................. 359/110, 119, 359/125, 127, 154, 166, 167, 168, 177; 398/9, 17, 20, 30, 31, 33, 32, 167, 167.5, 168, 175, 177

(56) References Cited

U.S. PATENT DOCUMENTS

| 5,296,957 A | * | 3/1994 | Takahashi et al. | .......... 359/177 |
| 5,353,110 A | * | 10/1994 | Jones | .......................... 356/73.1 |
| 5,825,515 A | * | 10/1998 | Anderson | .................... 359/110 |
| 5,923,453 A | * | 7/1999 | Yoneyama | .................... 359/177 |
| 6,160,648 A | * | 12/2000 | Öberg et al. | ................. 359/110 |
| 6,327,060 B1 | * | 12/2001 | Otani et al. | .................... 359/110 |
| 6,331,906 B1 | * | 12/2001 | Sharma et al. | ............... 359/119 |
| 6,424,445 B1 | * | 7/2002 | Tsushima et al. | ........... 359/177 |

FOREIGN PATENT DOCUMENTS

| DE | 27 51 645 | 12/1979 |
| DE | 27 52 688 | 12/1979 |
| DE | 32 13 020 | 10/1983 |
| DE | 43 28 486 | 3/1995 |

OTHER PUBLICATIONS

Rittich et al "Messgeräte für die optische Nachrichtentechnik", *Frequenz*, vol. 32, No. 12, 1978, pp. 350–356.

* cited by examiner

Primary Examiner—Leslie Pascal
Assistant Examiner—Dalzid Singh
(74) Attorney, Agent, or Firm—Bell Boyd & Lloyd LLC

(57) ABSTRACT

A central equipment is connected by at least two optical fibers to a decentralized optical equipment and the central equipment creates an optical auxiliary signal which is transmitted together with an optical payload signal from the central equipment to the decentralized equipment. The optical auxiliary signal that is received in the decentralized optical equipment is rerouted and transmitted back to the central optical equipment via another optical fiber in addition to a second payload signal, and the reception of the optical auxiliary signal is optically monitored in the central optical equipment to determine if there is a breakage in either one of the fibers extending to the unit.

10 Claims, 2 Drawing Sheets

METHOD FOR MONITORING THE OPERATION OF OPTICAL FIBERS

BACKGROUND OF THE INVENTION

The present invention is directed to a method for monitoring the operation of optical fibers within a fully optical fiber-bound communication network, in which method at least two optical fibers are provided for the purpose of transmitting optical payload signals between a central optical equipment and an optical equipment at a decentralized location.

In fully optical fiber-bound communication networks of today, in particular in communication networks having a ring topology or a double-star topology, the communication equipment of a network customer, for instance an Internet provider, is connected to the fully optical communication network with the aid of a plurality of optical feed fibers or, respectively, pairs of fibers. Volumes of data in the gigabit range are typically transmitted via such optical feed fibers and the data is transmitted between the central equipment, for example a network node of a fully optical communication network, and a decentralized optical equipment, for instance a network terminal device. When data is transmitted at such high rates, the network customer demands from the network operator a high reliability of the fully optical communication network and of the connection to the fully optical communication network. In order to be able to ensure a perfect functioning of the connection of the communication equipment of the network customer to the fully optical communication network, this connection must be remotely monitored. This means that the information about the operational condition of the optical feed fibers for the respective network connection must be available in the respective network node. If, for example, a malfunction occurs for the connection of a network customer, without a remote monitoring of the connection of the network customer, it is impossible for the network operator to assess whether the malfunction is his own responsibility, for instance because a digging or excavating equipment has damaged one of the optical feed fibers, or if the error is the responsibility of the network customer, for instance because the transmitting laser is defective.

Therefore, it is advantageous to be able to automatically monitor, by means of a remote monitoring process, whether or not malfunctions or, respectively, interruptions in optical feed fibers are the responsibility of the network operator.

A method for "monitoring optical single-fiber connection lines up to a passive interface" is already known from German 43 28 486 A1, in which method, in order to be able to effectively monitor an optical B-ISDN subscriber terminal, a monitoring signal that is defined by the carrier impulses and is originally electronic is transmitted from an optical fiber cable (LWL) terminal unit, particularly the subscriber's terminal unit at the network side, to a defined passive optical interface, whereby this monitoring signal is added in the fiber-optic terminal unit to the electrical control signal of the transmitter of this monitoring signal that is provided there. In addition, a small part of the optical signal that is transmitted from the fiber-optic terminal unit to the subscriber terminal (that is both the payload signal and the monitoring signal) is tapped at a passive optical interface and transmitted in the reverse direction to the fiber-optic terminal line, where it is converted into an electrical signal in the provided optical receiver potentially together with the optical signal being received from the subscriber.

In addition, the German Reference explicitly describes the evaluation of this type of back-fed electrical monitoring signal for the purpose of monitoring the subscriber terminal. But, this type of monitoring method is associated with an unfeasibly high technical outlay and, thus, unjustifiable costs. Furthermore, a high technical outlay is required in order to precisely separate the desired reflections at the passive interface from the additional reflections at other locations in order to be able to guarantee a high reliability of the monitoring method.

SUMMARY OF THE INVENTION

The object of the present invention is to simplify the monitoring of the operation of optical fibers in a fully optical fiber-bound communication network, particularly the monitoring of a plurality of feed fibers between a central equipment and a decentralized equipment, with respect to the technical outlay needed for the realization. This object is achieved by an improvement in a method for monitoring the operation of optical fibers in a fully optical fiber-bound communication network, wherein at least two optical fibers are provided for transmitting optical payload signals between the central and decentralized optical equipment with the improvements being that a central equipment generates an optical auxiliary signal and transmits this signal from the central optical equipment to the decentralized optical equipment via one of the optical fibers together with the first optical payload signal, the decentralized optical equipment receives this auxiliary optical signal, reroutes the signal and transmits the signal back to the central optical equipment in addition to the second optical payload signal via another optical fibers and that the central optical equipment monitors the reception of the retransmitted optical auxiliary signal.

The essential aspect of the invention is that the optical auxiliary signal that is generated in the central equipment is transmitted from the central optical equipment to the decentralized optical equipment together with a first optical payload signal via one of the optical fibers, and that the optical auxiliary signal that is received in the decentralized optical equipment is rerouted or redirected and transmitted back to the central optical equipment in addition to a second optical payload signal via another optical fiber. In addition, the reception of the retransmitted optical auxiliary signal in the central optical equipment is monitored optically. It is advantageous here that an additional optical auxiliary signal is generated in the network node and is transmitted to the network terminal device in addition to a payload signal via the complete feed fiber, whereby the auxiliary signal does not have to satisfy high quality requirements. Therefore, a cost-effective layer diode, or potentially an LED, respectively, can be used to generate this auxiliary signal. The auxiliary signal is coupled in and out of the central equipment or decentralized equipment, particularly, advantageously, using optical couplers so that an additional conversion of the optical auxiliary signal into an electrical signal is not necessary. The rerouting of the optical auxiliary signal in the decentralized equipment can also be realized by a simple additional optical fiber and, thus, does not require a high technical outlay. In other words, the network terminal device installed at the network customer comprises a simple passive structure and is, thus, extremely reliable. Furthermore, an external power source or supply for the network terminal device is not required locally at the network customer, which fact lends additional flexibility with respect to the selection of the location for operating the network terminal device. It is particulary advantageous that the normal operation of the optical fibers is indicated by the reception of the retransmitted optical auxiliary signal in the central optical equipment.

In addition to the optical auxiliary signal, the second optical payload signal is evaluated in the central optical equipment for the purpose of monitoring the operational condition of the two optical fibers. In this way, a fiber break or, respectively, a transmission failure in the optical fibers, via which the first optical payload signal is transmitted from the central to the decentralized equipment, can be detected particularly advantageously on the basis of an absence of a retransmitted optical auxiliary signal when this signal is not received and the second optical payload signal is received in the central optical equipment.

According to another development of the inventive method, at least a portion of the auxiliary signal received in the decentralized optical equipment is tapped, and the fiber condition information, which is contained in the tapped auxiliary signal, relating to the operational condition of at least one optical fiber is indicated in the decentralized optical equipment. In addition, the frequency of the optical auxiliary signal lies in the optically visible frequency range and comprises an optical power intensity of less than two milliwatts in the generation process in the network node. This is associated with the advantage that a portion of the optical signal can be tapped in the network terminal device and indicated to the network customer at the network terminal device directly, without endangering the eyesight of the maintenance personnel. Thus, the network customer receives information about the operational condition of the feed fibers from the network node to the network terminal device in a particularly simple and efficient manner and, when a failure of the feed fiber is occurring, this customer can report this information to the network operator by telephone.

Other advantages and features of the invention will be readily apparent from the following description of the preferred embodiments, the drawings and claims.

DESCRIPTION OF THE PREFERRED EMBODIMENTS

Figure 1:
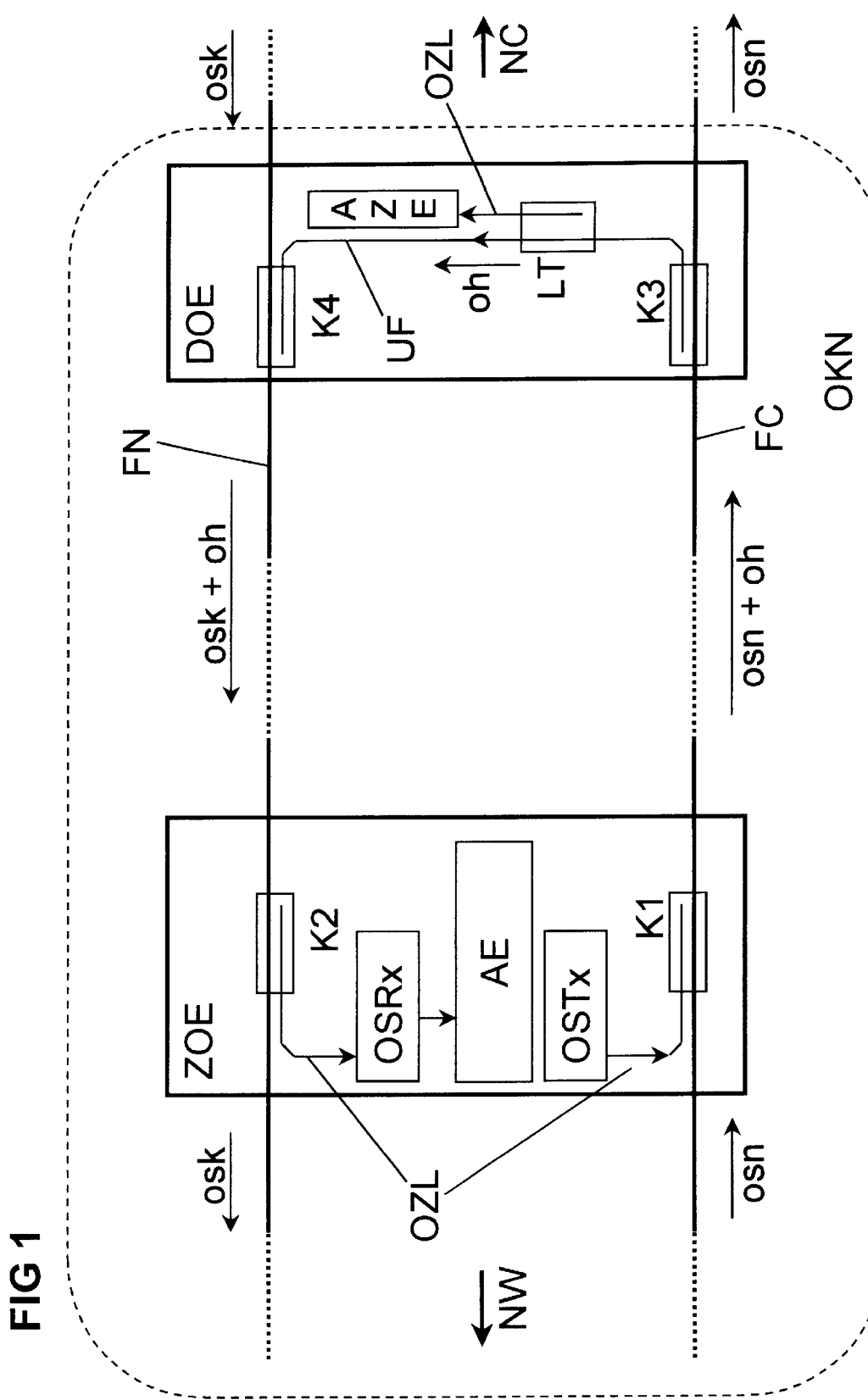
FIG. 1 is a basic circuit diagram of an optical feed fiber pair between an optical network node and an optical terminal device of a fully optical communication network.

The principles of the present invention are particularly useful when incorporated in a fully optical fiber-bound communication network OKN, which comprises a central optical equipment ZOE, for instance an optical network node, and a decentralized optical equipment DOE, for instance a network terminal device. Only one of the plurality of network nodes ZOE and only one of a plurality of network terminal devices of the fully optical fiber-bound communication network OKN are shown in the basic circuit diagram of FIG. 1. The network node ZOE and the network terminal device DOE are connected via a first optical fiber FC, which is used for transmitting data from the optical network NW, which is configured in a ring or double-star topology, to a network customer NC and via a second optical fiber, which is used for transmitting data from the network customer NC to the optical network NW. The distance between the network node ZOE and the network terminal device DOE, which is considerably greater in reality, is illustrated in dotted lines in FIG. 1.

In addition, a first optical transmitting unit OSTx for generating an optical auxiliary signal oh and a first optical receiving unit OSRx for receiving the retransmitted optical auxiliary signal oh are provided in the network node ZOE. The optical receiving unit OSRx is connected to an evaluation unit AE for evaluating the received optical auxiliary signal oh. In addition, first and second wavelength-selective couplers K1 and K2 are provided in the network node for coupling the optical auxiliary signal oh in and out, whereby the first wavelength-selective K1 is connected to the first optical fiber FC and via an optical feed fiber OZL to the first optical transmitting unit OSTx, and the second wavelength-selective coupler K2 is connected to the second optical fiber FN and via another optical feed fiber OZL to the first optical receiving unit OSRx.

The network terminal device likewise comprises third and fourth wavelength-selective couplers K3 and K4, which are connected via an optical rerouting or redirecting fiber UF, for example. The third wavelength-selective coupler K3 is connected to the first optical fiber FC, and the fourth wavelength-selective coupler K4 is connected to the second optical fiber FN. A power splitter LT is also provided, which is connected to an optical display unit AZE by an optical feed fiber OZL and to which the optical rerouting fiber UF is led.

A first optical payload signal osn that is transmitted from the optical network NW to the optical network node ZOE is conducted in the optical network node ZOE via the first optical fiber FC to the first wavelength-selective coupler K1. With the aid of the wavelength-selective coupler K1, an optical auxiliary signal oh and the first optical payload signal osn are then coupled together into a first optical signal osn+oh and transmitted via the first optical fiber FC to the network terminal device DOE. The first optical signal osn+oh that is received in the network terminal device DOE via the first optical fiber FC is decoupled with the aid of the third wavelength-selective coupler K3, and the recovered optical auxiliary signal oh is transmitted to the fourth wavelength-selective coupler K4 via the optical rerouting fiber UF. On the other hand, the first optical payload signal osn is forwarded to the network customer NC via the first optical fiber FC. Subsequently, a part of the signal power can be split off from the optical auxiliary signal oh that is led via the optical rerouting fiber UF with the aid of the power splitter LT and can be subsequently indicated to the network customer NC via the optical display unit AZE at the network terminal device DOE. This makes it possible for the network customer NC to optically monitor the operational condition of the first optical fiber FC at the network terminal device DOE.

The second optical payload signal osk, which is transmitted from the network customer NC to the network device DOE, is conducted in the network terminal device DOE to the fourth wavelength-selective coupler K4 via the second optical fiber FN. In the fourth wavelength-selective coupler K4, the rerouted optical auxiliary signal oh that was retransmitted via the optical rerouting fiber UF and the second optical payload signal osk are coupled together into a common second optical signal osk+oh and are transmitted via the second optical fiber FN from the network terminal device DOE to the optical network node ZOE. A portion of the second optical payload signal osk can potentially be coupled out with the aid of the second wavelength-selective coupler K2 and conducted to the first optical receiving unit OSRx via an optical feed fiber OZL in addition to the optical auxiliary signal oh that is coupled out. With the aid of the second wavelength-selective coupler K2, the optical auxiliary signal oh is filtered out of the second optical signal osk+oh and is conducted to the first optical receiving unit OSRx via an optical feed line or fiber OZL. The information about the operational condition of the first and second optical fibers FC and FN that is recovered by the first optical receiving unit OSRx from the optical auxiliary signal oh and potentially from the second optical payload signal osk is directed to the evaluation unit AE. The evaluation unit AE evaluates the reception or lack of reception of the retransmitted optical auxiliary signal oh and of the second optical payload signal osk for the purpose of monitoring the operational condition of the two optical fibers FC and FN in the central optical equipment ZOE. A normal, faultless operation of the optical fibers FC and FN is indicated by the reception of the retransmitted optical auxiliary signal oh and the second payload signal osk in the central optical equipment ZOE. Furthermore, the evaluation unit AE assesses an absence of the retransmitted optical signal oh and/or of the second optical payload signal osk in the central optical equipment ZOE with no reception thereof, as a fiber break or, respectively, as a transmission failure in the optical fibers FC and FN. The second optical payload signal osk, which remains after filtering by the second wavelength-selective coupler K2, is transmitted to the optical network NW of the fully optical communication network OKN of the network operator via the second optical fiber FN.

Figure 2:
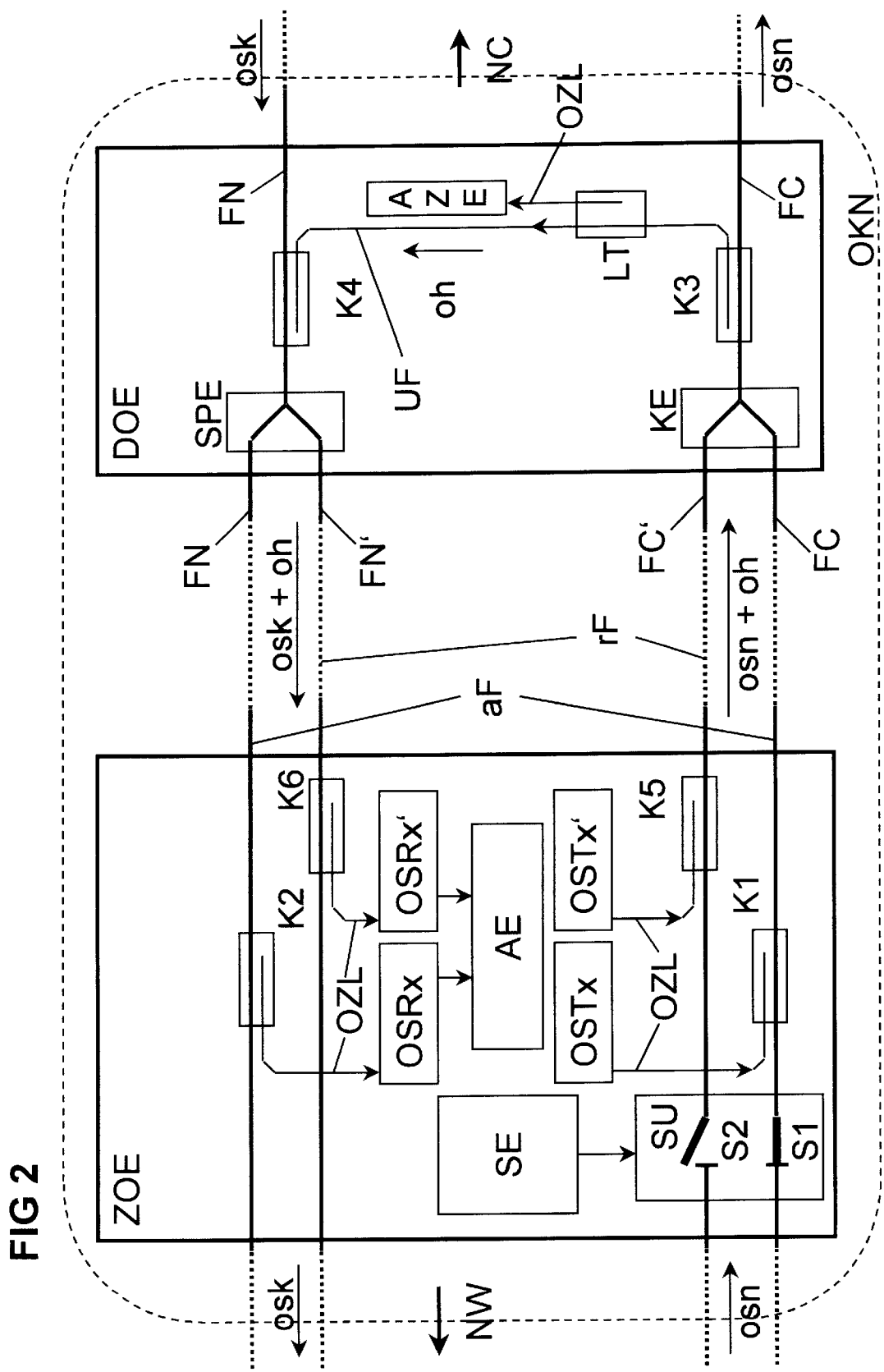
FIG. 2 is another basic circuit diagram of an optical feed fiber pair between an optical network node and the network terminal device of a fully optical communication network, wherein the pair has a 1+1 line protection.

Analogously to FIG. 1, FIG. 2 schematically shows a fully optical fiber-bound communication network OKN, whereby, for the purpose of improving the reliability of the connection of the network customer NC to the optical network NW, a 1+1 line protection is provided. This means that a third optical fiber FC' is made available in addition to a first optical fiber FC and a fourth optical fiber FN' is made available in addition to the second optical fiber FN for the connection of a network customer NC for transmitting the same first or second optical signal osn+oh and osk+oh. Thus, given failure or, respectively, where a malfunction occurs on one of the active optical fibers aF, that is on the first or second optical fiber FC and FN, a respective appertaining redundant optical fiber rF, that is the third or fourth optical fiber FC' and FN', can be used for subsequent data transmission.

To this end, compared to the arrangement described in FIG. 1, an additional second optical transmitting device OSTx' and a second optical receiving device OSRx' are provided in the network node ZOE, whereby the second optical receiving device OSRx' is likewise connected to the evaluation unit AE. In addition, the optical network node ZOE is equipped for coupling in the optical auxiliary signal oh onto the third optical fiber FC' and coupling this signal out from the fourth optical fiber FN' with the aid of a fifth and a sixth wavelength-selective coupler K5 and K6, whereby the second optical transmitting unit OSTx' is connected to the fifth wavelength-selective coupler K5 and the second optical receiving unit OSRx' is connected to the sixth wavelength-selective coupler K6 by optical feed fibers or lines OZL. FIG. 2 shows a first and second optical transmitting device OSTx and OSTx', whereby, as a further realization of the generation of the optical auxiliary signal oh and of its distribution to the active optical fibers aF and the redundant optical fibers rF, it would also be conceivable to use the first optical transmitting device OSTx and an additional power splitter, with the aid of which the generated optical auxiliary signal oh is distributed to the active and the redundant fibers aF and rF.

To realize the 1+1 line protection, a control unit SE and a switching unit SU comprising first and second optical switches S1 and S2 are additionally provided in the optical network node ZOE, so that the control of the switching unit SU is accomplished with the aid of the control unit SE. The first and second optical switches S1 and S2 are provided for connecting and disconnecting one of the redundant or active optical fibers aF and rF, respectively, and are controlled by the control unit SE via the switching unit SU.

In addition, the first optical signal osn+oh that is transmitted via the first and/or the third optical fibers FC and FC' is merged together using an additional combination unit KE that is additionally provided in the network terminal device DOE, which unit is connected to the third wavelength-selective coupler K3 via a first optical fiber FC. In addition, an optical splitter unit SPE is provided in the network terminal device DOE, with the aid of which unit the second optical payload signal osk, which was transmitted via the second optical fiber FN from the network customer NC to the network terminal device DOE, and the rerouted auxiliary signal oh, which was coupled with the second optical payload signal osk with the aid of the fourth wavelength-selective coupler K4, are distributed to the second and the fourth optical fibers FN and FN', for instance approximately equally. The second optical signal osk+oh is, thus, transmitted over the second and fourth optical fibers FN and FN' approximately at the same time. That is, the optical signal osk+oh that is transmitted via the fourth optical fiber FN', which is one of the redundant optical fibers rF, is present in the optical network node NOE in spite of a malfunction of the second optical fiber FN, which is caused by a line break, for example.

The first optical payload signal osn that is transmitted from the network NW to the network customer NC is already transmitted to the optical network node ZOE redundantly via an active and a redundant optical fiber aF and rF. In the optical network node ZOE, the feeding of the first optical payload signal osn to the third optical fiber FC', which is one of the redundant fibers rF, is interrupted, for instance by the second optical switch S2 that is provided in the switching unit SU. That is, from the optical network node ZOE to the network terminal device DOE, the first optical payload signal osn is transmitted via the first optical fiber FC exclusively. If there is now a malfunction in the operation of the first optical fiber FC, the second optical switch S2, which is open in FIG. 2, is closed and the first optical switch S1 is opened. That is, the first optical payload signal osn is subsequently transmitted from the optical network node ZOE to the network terminal device DOE via the third optical fiber FC'. Alternatively, with the aid of the switching unit SU, both the first and third optical fibers FC and FC' can be used for the data transmission, for instance simultaneously, and, thus, the respective optical fibers FC and FC' can be disconnected when there is a malfunction. Furthermore, analogously to the exemplifying embodiment illustrated in FIG. 1, the optical auxiliary signal oh that is generated by the first or second optical transmitting devices OSTx and OSTx', respectively, can be coupled in the optical network node ZOE with the first optical payload signal osn with the aid of the first or the fifth wavelength-selective coupler K1 or K5, respectively, into a first optical signal osn+oh, and can be transmitted to the network terminal device DOE via the first or third optical fibers FC or FC'.

The first optical signal osn+oh that is received in the network terminal device DOE via the first or the third optical fibers FC and FC' is conducted into the first optical fiber FC, which continues to exist with the aid of the combination unit KE, whereby, analogously to the specification of the first Figure, here, too, the optical auxiliary signal oh is separated from the first optical signal osn+oh with the aid of the third wavelength-selective coupler K3 and is conducted to the fourth wavelength-selective coupler K4 via the optical rerouting fiber UF. A portion of the rerouted optical auxiliary signal oh is split off here as well with the aid of the power splitter LT and is indicated to the network customer NC at the network terminal device DOE with the aid of the display unit AZE. In addition, the rerouted optical auxiliary signal oh and the second optical payload signal osk, which is transmitted from the network customer NC to the network terminal device DOE via the second optical fiber FN, are coupled together via the fourth optical wavelength-selective coupler K4 into a second optical signal osk+oh, which is conducted to the optical splitter unit SPE via the second optical fiber FN. There, the second optical signal osk+oh is distributed, for instance equally, onto the second and the fourth optical fibers FN and FN' and is subsequently transmitted to the optical network node ZOE.

In the optical network node ZOE, with the aid of the second or the sixth wavelength-selective coupler K2 or K6, the back-fed optical auxiliary signal oh is filtered out of the second optical signal osk+oh that was transmitted via both the active and the redundant fibers aF and rF and is then indicated to the first or the second optical receiving unit OSRx or OSRx' via the respective optical feed line or fiber OZL. The information about the operational condition of the first, second, third and fourth optical fibers FC, FC', FN and FN' that is acquired by the first and second optical receiving units OSRx and OSRx' from the optical auxiliary signal oh is indicated to the evaluation unit AE. The second optical payload signal osk, which remains after the filtering transmitted from the network node ZOE to the optical network NW redundantly via the second and the fourth optical fibers FN and FN'.

In contrast to the rerouting of the optical signals oh in the decentralized equipment ZOE with the aid of the single optical rerouting fiber UF, as illustrated in FIGS. 1 and 2, the realization of the inventive method with the 1+1 line protection, as illustrated in FIG. 2, could use two separate optical rerouting fibers UF with one for the active optical fibers aF and one for the redundant optical fibers rF in the network terminal device DOE.

The optical fibers FC, FC', FN and FN' that are provided for transmitting the optical payload signals osn and osk can be operated in a bidirectional or unidirectional operational mode, for example.

Although various minor modifications may be suggested by those versed in the art, it should be understood that we wish to embody within the scope of the patent granted hereon all such modifications as reasonably and properly come within the scope of our contribution to the art.

We claim:

1. A method for monitoring the operation of optical fibers in a fully optical fiber-bound communication network having at least two optical fibers being provided for transmitting optical payload signals between central and decentralized optical equipment, the method comprising:

generating an optical auxiliary signal in the central equipment and transmitting the signal from the central optical equipment to the decentralized optical equipment by one of the optical fibers together with a first optical payload signal;

receiving the first optical payload signal along with the optical auxiliary signal in the decentralized optical equipment and recovering the optical auxiliary signal from the received signals;

splitting off at least a portion of the recovered auxiliary signal in the decentralized optical equipment and displaying fiber condition information about the operational condition of the at least one of the optical fibers that are contained in the split-off auxiliary signal;

redirecting the recovered auxiliary signal and transmitting the redirected auxiliary signal back to the central optical equipment in addition to a second optical payload signal via another optical fiber; and receiving the transmitted optical auxiliary signal in the central optical equipment and monitoring the received optical auxiliary signal.

2. A method according to claim 1, which includes evaluating the optical auxiliary signal and the second optical payload signal in the central optical equipment for the purpose of monitoring the operational condition of the two optical fibers.

3. A method according to claim 1, wherein the frequency of the optical auxiliary signal lies in an optically visible frequency range.

4. A method according to claim 1, wherein the auxiliary signal that is generated in the central optical equipment has an optical power intensity of less than two milliwatts.

5. A method according to claim 1, which includes decoupling in the decentralized optical equipment the auxiliary signal from the received optical signal with the aid of a first wavelength-selective fiber coupler and combining the decoupled auxiliary signal to a second payload signal with the aid of a second fiber coupler, so that it can be transmitted back to the central optical equipment.

6. A method according to claim 1, wherein the central optical equipment is constructed as a network node and the decentralized optical equipment is conducted as a passive network terminal device of a fully optical fiber-bound communication network.

7. A method according to claim 1, wherein the system includes at least two active and two redundant optical fibers, said method includes generating at least one optical auxiliary signal in the central optical equipment and transmitting the optical auxiliary signal from the central optical equipment to a decentralized optical equipment via at least one of the active and/or redundant optical fibers, receiving the at least on e optical auxiliary signal in the decentralized optical equipment and redirecting it back to the central optical equipment via at least one of the active and redundant optical fibers.

8. A method according to claim 7, wherein, in the operation of at least two active and at least two redundant optical fibers, providing at least one optical switch in the central optical equipment with the aid of which at least one of the optical fibers is switched to an inactive condition, and at least one coupler and at least one optical power splitter in the decentralized equipment so that the optical payload signal and the auxiliary signal that are transmitted from the central equipment to the decentralized equipment via at least one of the active and redundant optical fibers are combined by the optical coupler and form an optical signal, and so that a second optical payload signal, which is transmitted via another optical fiber, is distributed by the optical power splitter to at least one fiber of the active and the redundant optical fibers which extend back to the central equipment.

9. A method according to claim 1, wherein the redirecting of the optical auxiliary signal is carried out in the decentralized optical equipment by at least one optical fiber being provided and installed for this purpose in the decentralized optical equipment.

10. A method according to claim 1, wherein the retransmitted optical auxiliary signal indicates a faultless operation of the optical fibers and potentially a second optical payload signal in the central optical equipment and the interruption of one of the optical fibers is indicated by the absence of the retransmitted optical auxiliary signal and the absence of the second optical payload signal in the central optical equipment.

* * * * *